Dec. 29, 1970     V. S. ESTEVE     3,550,376

SAFETY VALVE FOR DIVIDED SPACE

Filed Jan. 22, 1969

United States Patent Office 3,550,376
Patented Dec. 29, 1970

3,550,376
SAFETY VALVE FOR DIVIDED SPACE
Vicente Soler Esteve, Miranda, Venezuela, assignor to Tolaca, C.A., "Altamira," Distrito Sucre, Venezuela, Estado Miranda
Filed Jan. 22, 1969, Ser. No. 793,035
Int. Cl. B60t 11/10; F15b 7/00
U.S. Cl. 60—54.5                   1 Claim

ABSTRACT OF THE DISCLOSURE

A valve is provided which has a cylinder divided into two end chambers by an intermediate piston of spool-like shape. Two springs hold the piston in centered position so that pressure can be transmitted through the cylinder without the passage of the pressure medium through the cylinder. The valve can be employed in a hydraulic system in order to isolate the source from the utilization devices which may be, for example, brake systems on a vehicle. The valve serves to prevent leaks and other defects in the braking system from affecting the operation of the pressure source in such a manner as to affect the other braking system or utilization devices.

DRAWING

BACKGROUND

Figure 1:
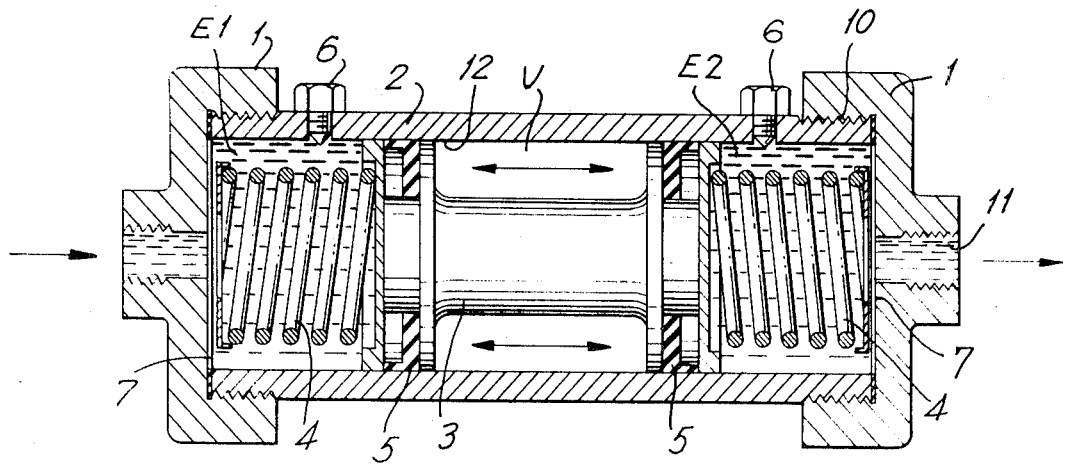
FIG. 1 is an axial section of a valve provided in accordance with the invention.
Figure 3:
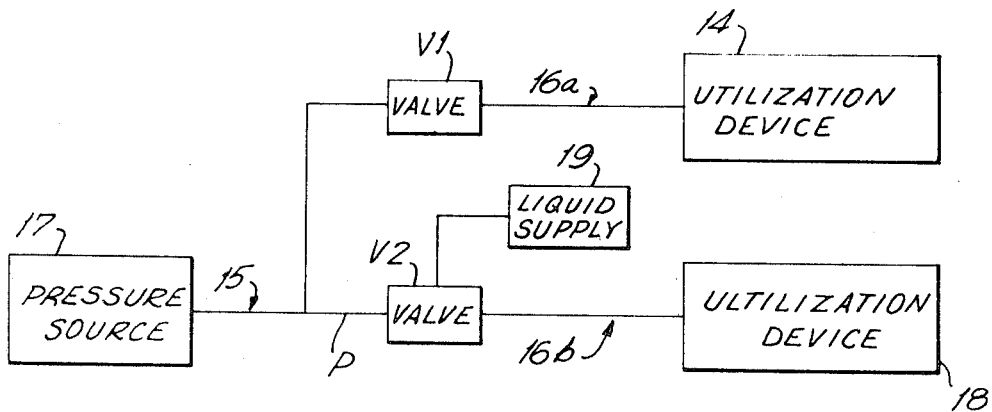
FIG. 3 illustrates a hydraulic system in which valves of the invention are employed.
Figure 2:
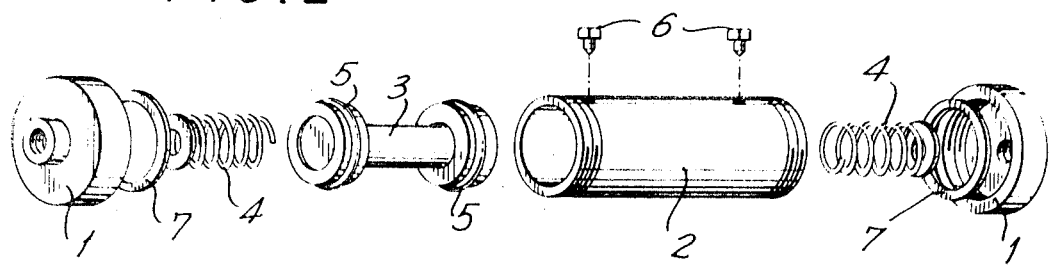
FIG. 2 is an exploded view of a valve such as illustrated in FIG. 1.

A system for the transmission of a force through a liquid is usually composed of three principal components which include a pump or force generator, an intermediate conductor or transmitter of the energy, and a motor or other device for the use of said energy.

These mechanisms are subject to leaks and losses deriving from such imperfections as can occur in seals or due to defective materials or construction faults in pipes. As a result of such problems, the forces which are to be transmitted lessen or cease entirely causing various difficulties.

The automotive industry, for instance, uses hydraulic-brake systems to stop or reduce the speed of cars. This system is based on the principle that a pressure applied to a liquid can be transmitted uniformly in all directions. The pressure applied by a driver to a brake pedal pushes a piston in a hydraulic pump which, by means of the liquid, transmits the resulting force through various pipes to the pistons which operate the brake shoes, slowing down the associated car or bringing it to a stop. The pressure applied flows through a system common to all wheels. In case of a leak of a seal or rupture of a pipe, the whole system fails, leaving the car without brake control.

To avoid this calamity, car makers are now obliged to install as standard equipment a double brake pump system operated by a common pedal. Thus, one pump is used for the front brake system and another for the rear brake system and any defect which might occur can affect only the corresponding pair of wheels while brake control is maintained by means of the other pair of wheels.

DETAILED DESCRIPTION

The present invention relates to a valve having a divided internal volume, and more particularly to valves adapted for being inserted into fluid conducting pipes to divide hydraulic systems into two parts.

In such a system, there is a principal part which activates the secondary part but both parts are otherwise independent of each other. The hydraulic force or pressure applied to the liquid of the principal part of the system is transmitted to the secondary part of the circuit by means of a mechanism to be hereinafter described. In case of failure, such as rupture or leakage and so forth in the secondary circuit, said mechanism will prevent the loss of pressure in the principal part of the system thereby maintaining effective all the other parts of the hydraulic system.

As shown in the drawing, the valve of the invention is constituted by a cylinder 2, a two-faced piston 3 and two seals 5 on each side of said piston along with other complementary parts.

The cylinder 2 is closed by means of end covers 1 which are screwed on at 10 and clamp against the ends of the cylinder by means of a circular seal. The covers have threaded holes 11 in their centers in order to enable their connection to the pipes of a hydraulic brake system.

The symmetrical two-faced piston is in spool form and is a moving element. It is made of a single solid piece and is slidable to adjust inside the cylinder with back and forth movements. It divides the cylinder into end chambers E1 and E2 with an intermediate chamber V therebetween.

At each end, the piston has the seals 5 of rubber or plastic, which seal tightly against the inside surface 12 of the cylinder wall according to the range of pressure exerted by the liquid. On each side of the piston and resting on the face of the seals are identical springs 4 which are helical springs of equal strength and which maintain the piston in centered position.

On top and near each end of the cylinder in end chambers E1 and E2, there are draining plugs 6 which enable eliminating air pockets.

When a valve of the above type is inserted into a pipe P of a hydraulic system, the system will be divided into a principal part 15 and a secondary part 16a or 16b. The princpal part extends from a pressure source 17, such as a pump piston, up to one face of the piston located in the cylinder of the valve. This principal part 15 is filled completely with liquid or fluid from the reserve of the pump. Part 15 can act, for example, on utilization device 14 through a valve V1. By means of the corresponding bolt 6, air pockets can be eliminated. The secondary part 16b for example, extends from the other face of the piston 3 through the pipe to the utilization device 18 which is to be operated. To fill this part of the system, a liquid supply 19 is required which can be connected to the hole of the other bolt which is removed for this purpose. The fluid is allowed into the pipe of secondary part 16 by enabling open drainage at the utilization device 18 whereby all air pockets are eliminated. In this manner, both parts 15 and 16 are completely filled with liquid without the inclusion of air.

The double-faced piston 3 is yieldably held in centered position inside the cylinder due to the equal pressures of the springs acting on both faces thereof.

If the hydraulic braking system of a vehicle has valves of the invention inserted into each of the four pipes connecting the pump thereof with the brake system at each wheel, the operation will be as described below.

Upon a pressing of the braking pedal, the pump exerts a pressure which will be transmitted through the liquid to the pistons in the valves.

This pressure will in turn be transmitted by the pistons to the liquid in the secondary parts of the system, compressing at the same time the springs therein. This positive pressure actuates the pistons or components that operate the brake shoes.

Once the brake pedal is released, the springs at the brakes as well as the springs 4 contained in the cylinders of the valves provide a reverse pressure forcing the pistons 3 back into their original centered positions.

The above valve of divided volume installed in the most convenient position in each of the pipes connecting the pressure source to the brake of each wheel, insures that a car, at any time due to a hydraulic system failure, not be without brakes. Due to the valve, pressure will always be maintained in the principal parts of the system involved, keeping the other three brake systems in operation.

What is claimed is:

1. A valve adapted for placement in respective conduits of a hydraulic system connecting a pressure source with pressure utilization devices, said valve comprising a cylinder with opposite open ends, end caps threaded on said cylinder at the ends thereof, each said end cap having an opening, one for connection with the pressure source and the other for connection with a utilization device, a symmetrical piston of spool shape slidably mounted in said cylinder and having opposite end faces, said piston dividing the cylinder into two end chambers and an intermediate chamber, helical springs of equal strength between the end caps and each of the end faces of the piston urging the piston into a centered position in the cylinder, flexible seals on said end faces of the piston sealing the end faces in the cylinder, said seals including a circular portion and axial portions projecting into the end chambers and urged against the cylinder with an intensity related to the fluid pressure in the cylinder, and air venting means in each of the end chambers.

References Cited

UNITED STATES PATENTS

| 2,746,252 | 5/1956 | Reese | 60—54.5E |
| 2,853,856 | 9/1958 | Castner | 60—54.5E |

FOREIGN PATENTS

| 483,869 | 6/1952 | Canada | 60—54.5E |

MARTIN P. SCHWADRON, Primary Examiner

R. R. BUNEVICH, Assistant Examiner

U.S. Cl. X.R.

303—84; 188—151